US009159292B2

(12) United States Patent
Amino

(10) Patent No.: US 9,159,292 B2
(45) Date of Patent: Oct. 13, 2015

(54) DISPLAY PANEL AND DISPLAY APPARATUS HAVING THE SAME

(71) Applicant: Samsung Display Co., LTD., Yongin, Gyeonggi-Do (KR)

(72) Inventor: Tadashi Amino, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 20 days.

(21) Appl. No.: 14/220,697

(22) Filed: Mar. 20, 2014

(65) Prior Publication Data

US 2015/0042632 A1 Feb. 12, 2015

(30) Foreign Application Priority Data

Aug. 7, 2013 (KR) ........................ 10-2013-0093461

(51) Int. Cl.
*G06F 3/038* (2013.01)
*G09G 5/00* (2006.01)
*G09G 3/36* (2006.01)

(52) U.S. Cl.
CPC .......... *G09G 3/3696* (2013.01); *G09G 2330/02* (2013.01)

(58) Field of Classification Search
CPC G09G 2330/021; G09G 3/369; G09G 3/3233
USPC .................................... 345/87–100, 211–213
See application file for complete search history.

(56) References Cited

U.S. PATENT DOCUMENTS

2003/0222838 A1 12/2003 Iida et al.
2004/0252116 A1* 12/2004 Tobita ........................... 345/211
2005/0140596 A1* 6/2005 Lee et al. ........................ 345/76
2005/0162373 A1* 7/2005 Yeh ............................... 345/100
2006/0181495 A1 8/2006 Edward
2007/0040781 A1* 2/2007 Senda et al. .................... 345/87
2010/0149080 A1 6/2010 Teranishi et al.

(Continued)

FOREIGN PATENT DOCUMENTS

JP 07253764 A 10/1995
JP 2002214645 A 7/2002
KR 1020110033647 A 3/2011

OTHER PUBLICATIONS

Search Report Application No. LA-201305-112-1 dated May 16, 2013.

*Primary Examiner* — Kimnhung Nguyen
(74) *Attorney, Agent, or Firm* — Cantor Colburn LLP

(57) ABSTRACT

A display panel includes setting gate lines to which a setting gate signal is applied, charging gate lines to which a charging gate signal is applied; data lines to which a data voltage is applied, and pixels connected to the setting gate lines, the charging gate lines and the data lines, where each of the pixels includes a first switching element connected to a corresponding setting gate line and a corresponding data line, a control capacitor configured to charge an output voltage of the first switching element, an amplifying part configured to amplify the output voltage of the first switching element charged at the control capacitor, a power supplying part connected to a corresponding charging gate line and configured to supply power to the amplifying part, and a liquid crystal capacitor configured to charge an output voltage of the amplifying part.

20 Claims, 5 Drawing Sheets

(56) References Cited

U.S. PATENT DOCUMENTS

| | | | | |
|---|---|---|---|---|
| 2010/0156877 | A1* | 6/2010 | Kimura | 345/211 |
| 2011/0063280 | A1* | 3/2011 | Lee et al. | 345/212 |
| 2011/0090196 | A1 | 4/2011 | Li et al. | |
| 2011/0148845 | A1* | 6/2011 | Uehara | 345/212 |
| 2013/0057518 | A1 | 3/2013 | Sugita et al. | |
| 2013/0082936 | A1* | 4/2013 | Islamkulov et al. | 345/173 |
| 2013/0278582 | A1* | 10/2013 | Liao et al. | 345/212 |
| 2013/0321382 | A1* | 12/2013 | Nagao | 345/212 |

* cited by examiner

DISPLAY PANEL AND DISPLAY APPARATUS HAVING THE SAME

This application claims priority to Korean Patent Application No. 10-2013-0093461, filed on Aug. 7, 2013, and all the benefits accruing therefrom under 35 U.S.C. §119, the content of which in its entirety is herein incorporated by reference.

BACKGROUND

1. Field

Exemplary embodiments of the invention relate to a display panel and a display apparatus including the display panel. More particularly, exemplary embodiments of the invention relate to a display panel with improved display quality and a display apparatus including the display panel.

2. Description of the Related Art

Generally, a liquid crystal display ("LCD") apparatus includes a first substrate including a pixel electrode, a second substrate including a common electrode and a liquid crystal layer disposed between the first and second substrates. An electric field is generated by voltages applied to the pixel electrode and the common electrode. By adjusting intensity of the electric field, transmittance of light passing through the liquid crystal layer may be adjusted to display an image.

When a resolution of the LCD apparatus is high, an image having a high display quality may be displayed, so that the resolution of the LCD apparatus is increasing recently. As the resolution of the LCD increases, a charging duration of the pixel decreases.

A desired voltage may not be charged to a pixel far from a data driver due to increase of resistance of a data line according to increase of length of the data line and the insufficient charging duration. Thus, a stain may be generated according to a position of a display panel.

In addition, when a current of the data driver increases to charge the pixel in short time, the data driver may generate heat and a power consumption of the data driver may increase.

SUMMARY

Exemplary embodiments of the invention provide a display panel with improved display quality and reduced power consumption.

Exemplary embodiments of the invention also provide a display apparatus including the display panel.

In an exemplary embodiment of a display panel according to the invention, the display panel includes a plurality of setting gate lines to which a setting gate signal is applied, a plurality of charging gate lines to which a charging gate signal is applied, a plurality of data lines to which a data voltage is applied, and a plurality of pixels connected to the setting gate lines, the charging gate lines and the data lines, where each of the pixels includes a first switching element connected to a corresponding setting gate line of the setting gate lines and a corresponding data line of the data lines, a control capacitor configured to charge an output voltage of the first switching element, an amplifying part configured to amplify the output voltage of the first switching element charged at the control capacitor, a power supplying part connected to a corresponding charging gate line of the charging gate lines and configured to supply a power voltage to the amplifying part, and a liquid crystal capacitor configured to charge an output voltage of the amplifying part.

In an exemplary embodiment, the first switching element may include a control electrode connected to the corresponding setting gate line, an input electrode connected to the corresponding data line, and an output electrode connected to a first terminal of the control capacitor.

In an exemplary embodiment, the amplifying part may include a second switching element and a third switching element, where the second switching element and the third switching element may be connected to each other in series, an input node of the amplifying part may be connected to a first terminal of the control capacitor, and an output node of the amplifying part may be connected to a first terminal of the liquid crystal capacitor.

In an exemplary embodiment, the second switching element may be a P-type transistor and the third switching element may be an N-type transistor.

In an exemplary embodiment, the power supplying part may include a fourth switching element and a fifth switching element, where the fourth switching may include a control electrode connected to the corresponding charging gate line, an input electrode to which a high power voltage is applied and an output electrode connected to an input electrode of the second switching element, and the fifth switching may include a control electrode connected to the corresponding charging gate line, an input electrode connected to an output electrode of the third switching element and an output electrode to which a ground voltage is applied.

In an exemplary embodiment, a high level duration of the charging gate signal may be longer than a high level duration of the setting gate signal.

In an exemplary embodiment, the high level durations of the charging gate signal may be about N times the high level duration of the setting gate signal, and N may be a positive integer equal to or greater than two.

In an exemplary embodiment, the charging gate signal applied to the corresponding charging gate line may be generated by OR operation of a plurality of setting gate signals to be applied to N setting gate lines of the setting gate lines, where the N setting gate lines includes the corresponding setting gate line.

In an exemplary embodiment, a capacitance of the liquid crystal capacitor may be greater than a capacitance of the control capacitor.

In an exemplary embodiment, when a pixel voltage charged at the liquid crystal capacitor is denoted by x and a gain of the amplifying part is denoted by A, the data voltage may be about x/A.

In an exemplary embodiment, the amplifying part may include an inverting amplifier.

In an exemplary embodiment of a display apparatus, according to the invention, the display apparatus includes a setting gate driving part which generates a setting gate signal; a charging gate driving part which generates a charging gate signal; a data driver which generates a data voltage; and a display panel including a plurality of setting gate lines to which the setting gate signal is applied, a plurality of charging gate lines to which the charging gate signal is applied; a plurality of data lines to which the data voltage is applied, and a plurality of pixels connected to the setting gate lines, the charging gate lines and the data lines, where each of the pixels includes a first switching element connected to a corresponding setting gate line of the setting gate lines and a corresponding data line of the data lines, a control capacitor configured to charge an output voltage of the first switching element, an amplifying part configured to amplify the output voltage of the first switching element charged at the control capacitor, a power supplying part connected to a corresponding charging gate line of the charging gate lines and configured to supply power to the amplifying part, and a liquid crystal capacitor configured to charge an output voltage of the amplifying part.

In an exemplary embodiment, the first switching element may include a control electrode connected to the corresponding setting gate line, an input electrode connected to the corresponding data line and an output electrode connected to a first terminal of the control capacitor.

In an exemplary embodiment, the amplifying part may include a second switching element and a third switching element, where the second switching element and the third switching element may be connected to each other in series, an input node of the amplifying part may be connected to a first terminal of the control capacitor, and an output node of the amplifying part may be connected to a first terminal of the liquid crystal capacitor.

In an exemplary embodiment, the second switching element may be a P-type transistor and the third switching element may be an N-type transistor.

In an exemplary embodiment, the power supplying part may include a fourth switching element and a fifth switching element, the fourth switching may include a control electrode connected to the charging gate line, an input electrode to which a high power voltage is applied and an output electrode connected to an input electrode of the second switching element, and the fifth switching may include a control electrode connected to the charging gate line, an input electrode connected to an output electrode of the third switching element and an output electrode to which a ground voltage is applied.

In an exemplary embodiment, a high level duration of the charging gate signal may be longer than a high level duration of the setting gate signal.

In an exemplary embodiment, the high level durations of the charging gate signal may be about N times the high level duration of the setting gate signal, and N may be a positive integer equal to or greater than two.

In an exemplary embodiment, the setting gate driving part may output the setting gate signal to the setting gate line and the charging gate driving part, and the charging gate driving part may generate the charging gate signal based on the setting gate signal.

In an exemplary embodiment, the charging gate signal applied to the corresponding charging gate line may be generated by OR operation of a plurality of setting gate signals to be applied to N setting gate lines of the setting gate lines, where the N setting gate lines includes the corresponding setting gate line.

According to exemplary embodiments of the display panel and the display apparatus including the display panel, the display panel includes an amplifying part such that a charging time of a pixel may be decreased. In such embodiments, a stain on the display panel may be effectively prevented such that a display quality is substantially improved. In such embodiments, amplitude of a data voltage may be decreased such that power consumption of the display apparatus substantially decreases.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
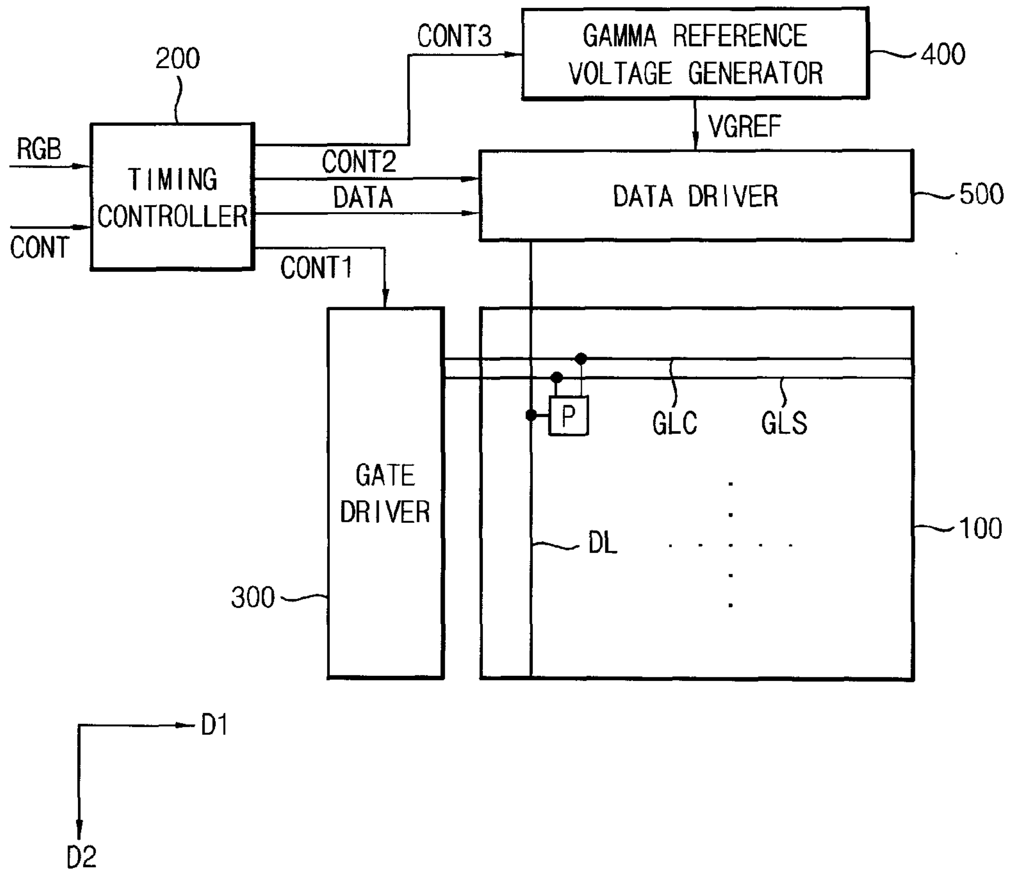
FIG. 1 is a block diagram illustrating an exemplary embodiment of a display apparatus, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a block diagram illustrating an exemplary embodiment of a display apparatus, according to the invention.

Referring to FIG. 1, an exemplary embodiment of the display apparatus includes a display panel 100 and a panel driver. The panel driver includes a timing controller 200, a gate driver 300, a gamma reference voltage generator 400 and a data driver 500.

The display panel 100 includes a display region on which an image is displayed and a peripheral region adjacent to the display region.

The display panel 100 includes a plurality of setting gate lines GLS, a plurality of charging gate lines GLC, a plurality of data lines DL and a plurality of pixels P. The setting gate lines GLS and the charging gate lines GLC extend substantially in a first direction D1, and the data lines DL extend substantially in a second direction D2 crossing the first direction D1. The first and second directions D1 and D2 may be substantially perpendicular to each other.

Each pixel P is electrically connected to a corresponding setting gate line GLS, a corresponding charging gate line GLC and a corresponding data line DL.

Each pixel P includes a switching element, a charging part and a power supplying part. The pixels P may be disposed substantially in a matrix form. In one exemplary embodiment, for example, a resolution of the display panel 100 may be 3840×2120. In such an embodiment, the display panel may include 3840×2120*3 pixels P. A structure of the pixel P will be described later in greater detail referring to FIG. 2.

The timing controller 200 receives input image data RGB and an input control signal CONT from an external apparatus (not shown). The input image data may include red image data R, green image data G and blue image data B. The input control signal CONT may include a master clock signal and a data enable signal. The input control signal CONT may include a vertical synchronizing signal and a horizontal synchronizing signal.

The timing controller 200 generates a first control signal CONT1, a second control signal CONT2, a third control signal CONT3 and a data signal DATA based on the input image data RGB and the input control signal CONT.

The timing controller 200 generates the first control signal CONT 1 for controlling an operation of the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates the data signal DATA based on the input image data RGB. The timing controller 200 outputs the data signal DATA to the data driver 500.

The timing controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals to be applied to the setting and charging gate lines GLS and GLC in response to the first control signal CONT1 received from the timing controller 200. The gate driver 300 sequentially outputs the gate signals to the setting and charging gate lines GLS and GLC.

In one exemplary embodiment, for example, the gate driver 300 generates setting gate signals to drive the setting gate lines GLS, and outputs the setting gate signals to the setting gate lines GLS. In one exemplary embodiment, for example, the gate driver 300 generates charging gate signals to drive the charging gate lines GLC, and outputs the charging gate signals to the charging gate lines GLC.

In an exemplary embodiment, the gate driver 300 may be directly mounted on the display panel 100, or may be connected to the display panel 100 as a tape carrier package ("TCP") type. In an alternative exemplary, the gate driver 300 may be integrated on the peripheral region of the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level, e.g., a voltage level, of the data signal DATA.

In an exemplary embodiment, the gamma reference voltage generator 400 may be disposed in the timing controller 200, or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into data voltages of analog type using the gamma reference voltages VGREF. The data driver 500 sequentially outputs the data voltages to the data lines DL.

The data driver 500 may include a shift register (not shown), a latch (not shown), a signal processing part (not shown) and a buffer part (not shown). The shift register outputs a latch pulse to the latch. The latch temporally stores the data signal DATA. The latch outputs the data signal DATA to the signal processing part. The signal processing part generates a data voltage of analog type based on the data signal of digital type and the gamma reference voltage VGREF. The signal processing part outputs the data voltage to the buffer part. The buffer part compensates the data voltage to have a substantially uniform level. The buffer part outputs the compensated data voltage to the data line DL.

In an exemplary embodiment, the data driver 500 may be directly mounted on the display panel 100, or be connected to the display panel 100 in a TCP type. In an alternative exemplary embodiment, the data driver 500 may be integrated on the display panel 100.

Figure 2:
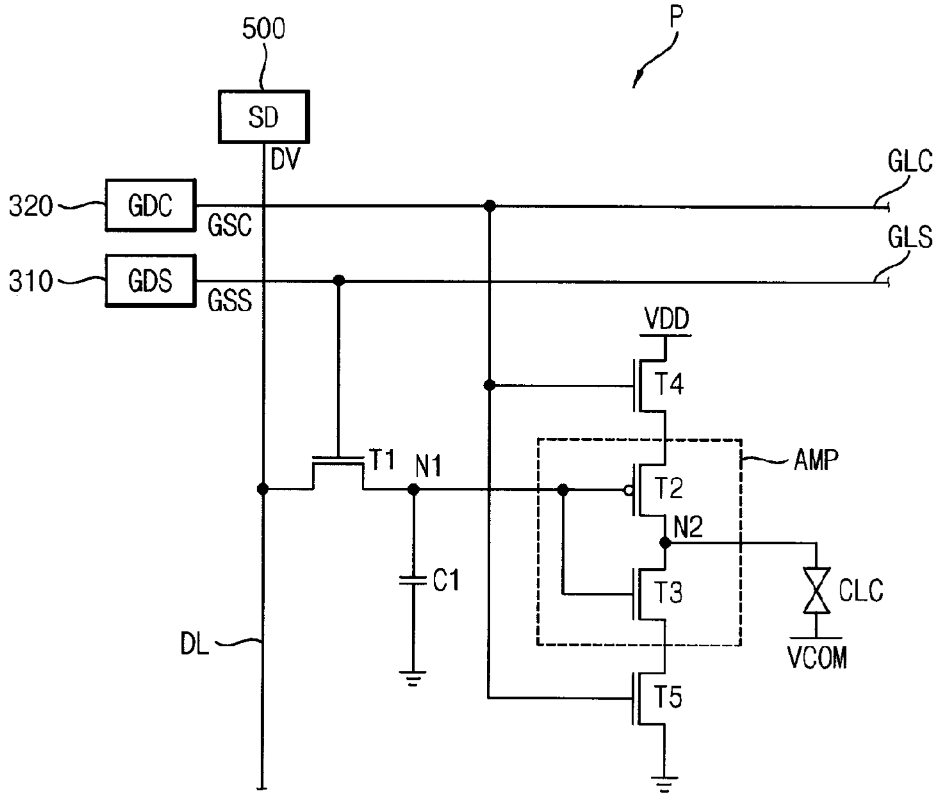
FIG. 2 is a circuit diagram illustrating a gate driver, a data driver and a pixel in a display panel of FIG. 1.
Figure 3:
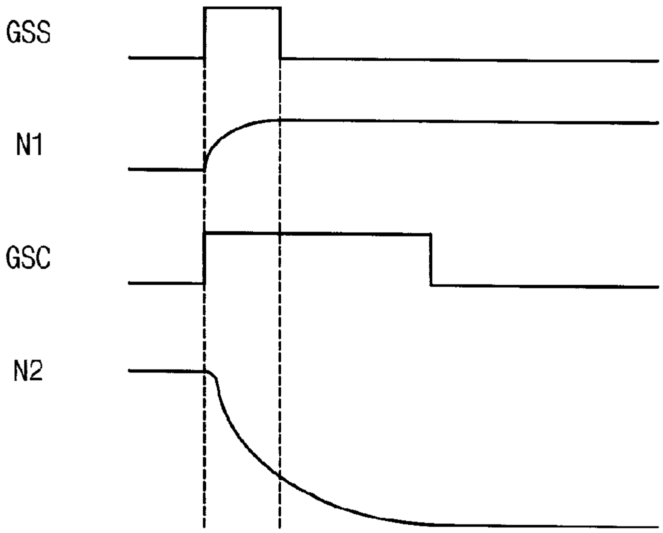
FIG. 3 is a waveform diagram illustrating input signals and node signals of the pixel of FIG. 2.

FIG. 2 is a circuit diagram illustrating the gate driver 300, the data driver 500 and the pixel P of the display panel 100 of FIG. 1. FIG. 3 is a waveform diagram illustrating input signals and node signals of the pixel P of FIG. 2.

Referring to FIGS. 1 to 3, the display panel 100 includes the setting gate line GLS, the charging gate line GLC, the data line DL and the pixel P.

The gate driver 300 includes a setting gate driving part (also referred to as GDS in FIG. 2) 310 and a charging gate driving part (also referred to as GDC in FIG. 2) 320. The setting gate driving part 310 generates the setting gate signal GSS based on the first control signal CONT1, and applies the setting gate signal GSS to the setting gate line GLS. The charging gate driving part 320 generates the charging gate signal GSC based on the first control signal CONT1, and applies the charging gate signal GSC to the charging gate line GLC.

The setting gate line GLS provides the setting gate signal GSS to the pixel P. The charging gate line GLC provides the charging gate signal GSC to the pixel P.

The pixel P includes a first switching element T1, a control capacitor C1, an amplifying part AMP, a power supplying part and a liquid crystal capacitor CLC.

The first switching element T1 is connected to the setting gate line GLS and the data line DL. The first switching element T1 includes a control electrode connected to the setting gate line GLS, an input electrode connected to the data line DL and an output electrode connected to a first node N1.

The first switching element T1 may be a thin film transistor ("TFT"). The first switching element T1 may be an N-type transistor. The control electrode of the first switching element T1 may be a gate electrode. The input electrode of the first switching element T1 may be a source electrode. The output electrode of the first switching element T1 may be a drain electrode.

The control capacitor C1 charges an output voltage of the first switching element T1. The control capacitor C1 includes a first terminal connected to the first node N1 and a second terminal to which a ground voltage is applied.

In an exemplary embodiment, the amplifying part AMP amplifies the output voltage of the first switching element T1 charged at the control capacitor C1. The amplifying part AMP includes a second switching element T2 and a third switching element T3. The second switching element T2 and the third switching element T3 are connected to each other in series.

The second switching element T2 includes a control electrode connected to the first node N1, an input electrode connected to an output electrode of a fourth switching element T4 of the power supplying part and an output electrode connected to a second node N2.

The third switching element T3 includes a control electrode connected to the first node N1, an input electrode connected to the second node N2 and an output electrode connected to an input electrode of a fifth switching element T5 of the power supplying part.

The first node N1 may be connected to an input node of the amplifying part AMP. The second node N2, to which the output electrode of the second switching element T2 and the input electrode of the third switching element T3 are connected, may be connected to an output node of the amplifying part AMP.

The second switching element T2 may be a TFT. The second switching element T2 may be a P-type transistor. The control electrode of the second switching element T2 may be a gate electrode. The input electrode of the second switching element T2 may be a source electrode. The output electrode of the second switching element T2 may be a drain electrode.

The third switching element T3 may be a TFT. The third switching element T3 may be an N-type transistor. The control electrode of the third switching element T3 may be a gate electrode. The input electrode of the third switching element T3 may be a source electrode. The output electrode of third switching element T3 may be a drain electrode.

In an exemplary embodiment of the invention, the amplifying part AMP may include an inverting amplifier.

The power supplying part is connected to the charging gate line GLC to supply a power voltage to the amplifying part AMP. The power supplying part includes the fourth and fifth switching elements T4 and T5. The fourth and fifth switching elements T4 and T5 are connected to the charging gate line GLC.

The fourth switching element T4 includes a control electrode connected to the charging gate line GLC, an input electrode, to which a high power voltage VDD is applied, and the output electrode connected to the input electrode of the second switching element T2.

The fifth switching element T5 includes a control electrode connected to the charging gate line GLC, the input electrode connected to the output electrode of the third switching element T3 and an output electrode, to which a ground voltage is applied.

The fourth switching element T4 may be a TFT. The fourth switching element T4 may be an N-type transistor. The control electrode of the fourth switching element T4 may be a gate electrode. The input electrode of the fourth switching element T4 may be a source electrode. The output electrode of fourth switching element T4 may be a drain electrode.

The fifth switching element T5 may be a TFT. The fifth switching element T5 may be an N-type transistor. The control electrode of the fifth switching element T5 may be a gate electrode. The input electrode of the fifth switching element T5 may be a source electrode. The output electrode of fifth switching element T5 may be a drain electrode.

Hereinafter, an operation of the pixel P will be described.

The data driver (also referred to as SD in FIG. 2) 500 applies a data voltage DV to be charged at the control capacitor C1 to the data line DL.

When the setting gate signal GSS is in a high level, the first switching element T1 is turned on, the data voltage DV is charged at the control capacitor C1.

A capacitance of the control capacitor C1 may be less than a capacitance of the liquid crystal capacitor CLC. In one exemplary embodiment, for example, the capacitance of the control capacitor C1 may be equal to or less than about a half of the capacitance of the liquid crystal capacitor CLC.

In such an embodiment, the data voltage DV charged at the control capacitor C1 is amplified by the amplifying part AMP, and the data voltage DV charged at the control capacitor C1 may be less than a pixel voltage charged at the liquid crystal capacitor CLC.

In one exemplary embodiment, for example, when the pixel voltage charged at the liquid crystal capacitor CLC is denoted by x, and a gain (an absolute value of a gain) of the amplifier AMP is denoted by A, the data voltage DV may be x/A. In one exemplary embodiment, for example, the gain of the amplifier AMP may be substantially equal to or greater than two.

The capacitance of the control capacitor C1 is less than the capacitance of the liquid crystal capacitor CLC such that the charging duration may be decreased compared to a conventional display panel.

When the setting gate signal GSS is in the high level, the charging gate signal GSC may be in a high level. When the charging gate signal GSC is in the high level, the fourth and fifth switching elements T4 and T5 are turned on such that the power voltage is supplied to the amplifying part AMP. The amplifying part AMP amplifies the voltage charged at the control capacitor C1 and charges the amplified voltage to the liquid crystal capacitor CLC.

In an exemplary embodiment, where the amplifying part AMP includes the inverting amplifier, a polarity of a voltage at the second node N2 may be opposite to a polarity of a voltage at the first node N1.

When the amplifying part AMP is operating, the setting gate signal GSS is changed to a low level. Accordingly, the first switching element T1 is turned off. Although the first switching element T1 is turned off, the control capacitor C1 are substantially fully charged by the data voltage DV, as shown in FIG. 3, such that the pixel voltage is charged at the liquid crystal capacitor CLC by the amplifying part AMP.

In an exemplary embodiment, a high level duration of the charging gate signal GSC is longer than a high level duration of the setting gate signal GSS. Thus, although the high duration of the setting gate signal GSS is relatively short, the pixel voltage is continuously charged at the liquid crystal capacitor CLC in response to the charging gate signal GSC such that a pixel voltage charged at the liquid crystal capacitor CLC are substantially great.

After the pixel voltage is charged at the liquid crystal capacitor CLC, the charging gate signal GSC is changed to a low level. When the charging gate signal GSC is changed to be in the low level, the fourth and fifth switching elements T4 and T5 are turned off such that a current does not flow through the amplifying part AMP. Thus, a power consumption of the display apparatus may decrease.

Figure 4:
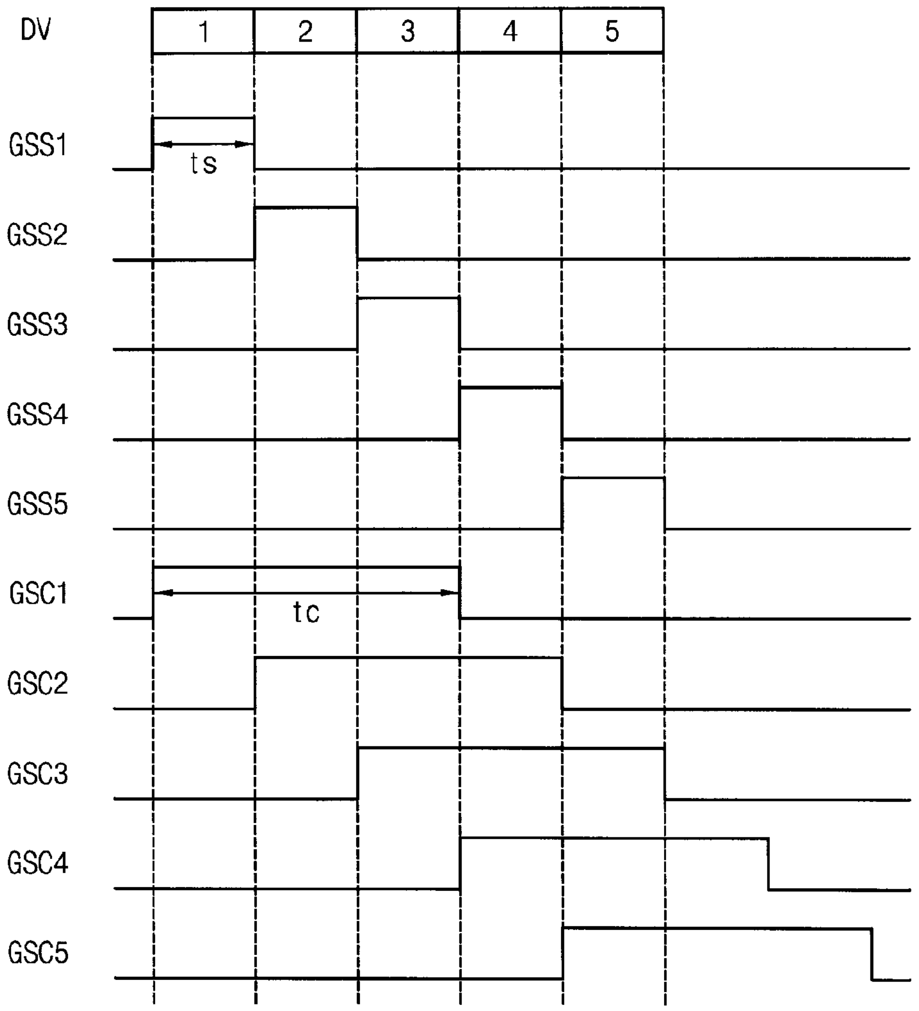
FIG. 4 is a signal timing diagram of gate signals of the gate driver of FIG. 1.

FIG. 4 is a signal timing diagram of gate signals of the gate driver 300 of FIG. 1.

First to fifth setting gate signals GSS1 to GSS5 and first to fifth charging gate signals GSC1 to GSC5 among the gate signals of the gate driver 300 are shown in FIG. 4 for convenience of illustration.

Referring to FIGS. 1 to 4, high level durations tc of the charging gate signals GSC1 to GSC5 are longer than high level durations ts of the setting gate signals GSS1 to GSS5. In one exemplary embodiment, for example, rising edges of the charging gate signals GSC1 to GSC5 are substantially the same as rising edges of the setting gate signals GSS1 to GSS5, respectively.

In one exemplary embodiment, for example, the high level durations tc of the charging gate signals GSC1 to GSC5 may be about N times the high level durations ts of the setting gate signals GSS1 to GSS5, respectively. Herein, N is a positive integer equal to or greater than 2.

In an exemplary embodiment of the invention, as shown in FIG. 4, the high level durations tc of the charging gate signals GSC1 to GSC5 may be about three times the high level durations ts of the setting gate signals GSS1 to GSS5, respectively.

According to an exemplary embodiment, as described above, the control capacitor C1 has the capacitance less than the capacitance of the liquid crystal capacitor CLC such that the charging time, which corresponds to scanning time of the gate lines, may be decreased. Thus, the display panel 100 may have relatively high resolution. The pixel P includes the amplifying part AMP such that the pixel voltage charged to the liquid crystal capacitor CLC may be substantially great during the short charging time. Thus, in such an embodiment, the stain on the display panel is effectively prevented, and the display quality of the display panel 100 is thereby substantially improved.

In an exemplary embodiment, where the pixel P includes the amplifying part AMP, a level of the data voltage DV may be decreased. In such an embodiment, the pixel voltage charged at the liquid crystal capacitor CLC is substantially great, and the current flowing through the amplifying part AMP may be controlled, e.g., blocked, by the power supplying part. Thus, in such an embodiment, the power consumption of the display apparatus may decrease.

Figure 5:
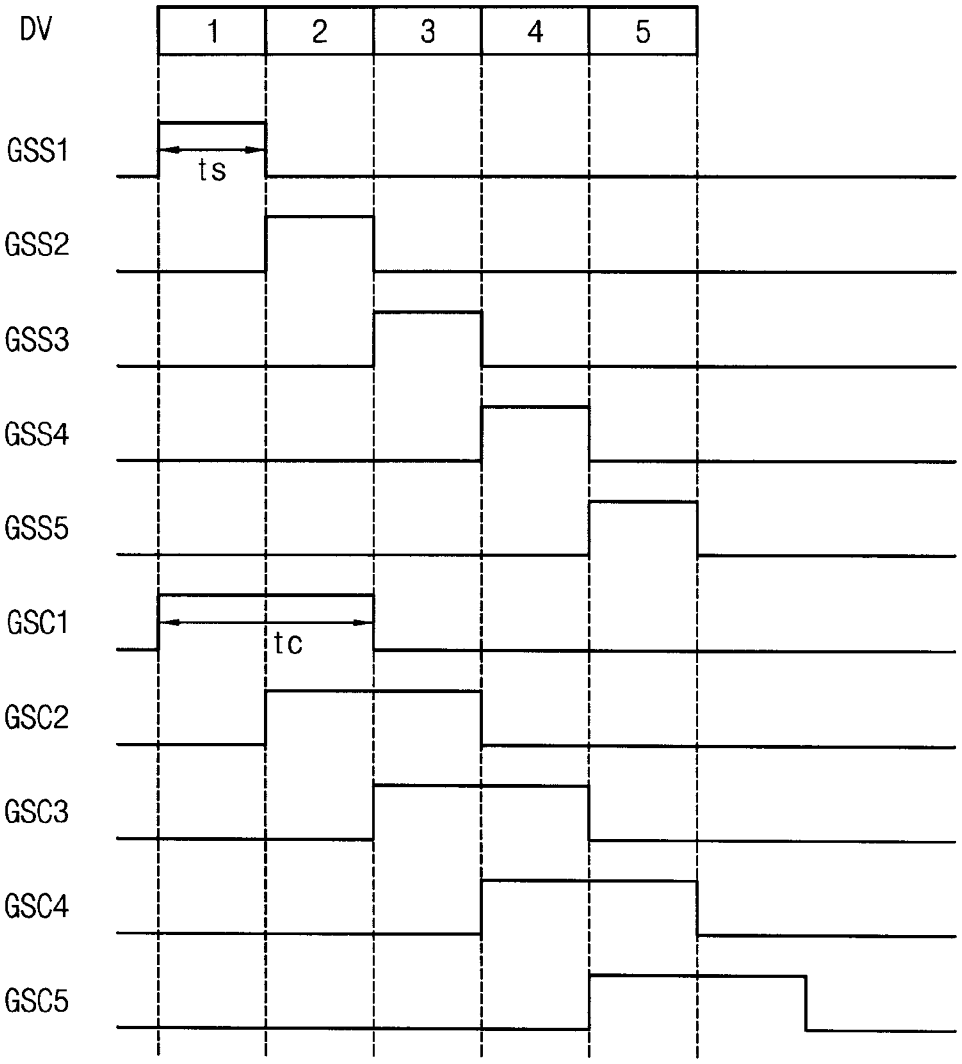
FIG. 5 is a signal timing diagram of gate signals of a gate driver of an exemplary embodiment of the display apparatus, according to the invention.

FIG. 5 is a signal timing diagram of gate signals of a gate driver of an exemplary embodiment of the display apparatus, according to the invention.

First to fifth setting gate signals GSS1 to GSS5 and first to fifth charging gate signals GSC1 to GSC5 of the gate signals of the gate driver of an exemplary embodiment of the display apparatus are shown in FIG. 5 for convenience of illustration.

The exemplary embodiment of the display apparatus in FIG. 5 is substantially the same as the exemplary embodiment of the display apparatus described referring to FIGS. 1 to 4 except for the gate signals of the gate driver. Thus, the same or like elements of the display apparatus in FIG. 5 will be referred to as the same reference characters as used above to describe the exemplary embodiments of the display apparatus shown in FIGS. 1 to 4, and any repetitive detailed description thereof will hereinafter be omitted.

Referring to FIGS. 1 to 3 and 5, an exemplary embodiment of the display apparatus includes a display panel 100 and a panel driver. The panel driver includes a timing controller 200, a gate driver 300, a gamma reference voltage generator 400 and a data driver 500.

The display panel 100 includes a plurality of setting gate lines GLS, a plurality of charging gate lines GLC, a plurality of data lines DL and a plurality of pixels P.

The gate driver 300 includes a setting gate driving part (GDS in FIG. 1) 310 and a charging gate driving part (GDC in FIG. 2) 320. The setting gate driving part 310 generates the setting gate signal GSS based on the first control signal CONT1 and applies the setting gate signal GSS to the setting gate line GLS. The charging gate driving part 320 generates the charging gate signal GSC based on the first control signal CONT1 and applies the charging gate signal GSC to the charging gate line GLC.

The setting gate line GLS provides the setting gate signal GSS to the pixel P. The charging gate line GLC provides the charging gate signal GSC to the pixel P.

The pixel P includes a first switching element T1, a control capacitor C1, an amplifying part AMP, a power supplying part and a liquid crystal capacitor CLC.

In an exemplary embodiment, high level durations tc of the charging gate signals GSC1 to GSC5 are respectively longer than high level durations ts of the setting gate signals GSS1 to GSS5. In one exemplary embodiment, for example, rising edges of the charging gate signals GSC1 to GSC5 are respectively substantially the same as rising edges of the setting gate signals GSS1 to GSS5.

In one exemplary embodiment, for example, the high level durations tc of the charging gate signals GSC1 to GSC5 may be respectively about N times the high level durations ts of the setting gate signals GSS1 to GSS5. Herein, N is a positive integer equal to or greater than 2.

In an exemplary embodiment of the invention, as shown in FIG. 5, the high level durations tc of the charging gate signals GSC1 to GSC5 may be respectively about twice the high level durations ts of the setting gate signals GSS1 to GSS5.

According to the exemplary embodiment, the control capacitor C1 has the capacitance less than the capacitance of the liquid crystal capacitor CLC such that the charging time, which corresponds to scanning time of the gate lines, may be decreased. Thus, the display panel 100 may have relatively high resolution. The pixel P includes the amplifying part AMP such that the pixel voltage charged to the liquid crystal capacitor CLC may be substantially great in the short charging time. Thus, the stain on the display panel is effectively prevented, and the display quality of the display panel 100 is thereby substantially improved.

The pixel P includes the amplifying part AMP such that a level of the data voltage DV may be decreased. In such an embodiment, when the pixel voltage charged at the liquid crystal capacitor CLC is substantially great, the current flowing through the amplifying part AMP may be blocked using the power supplying part. Thus, the power consumption of the display apparatus may decrease.

Figure 6:
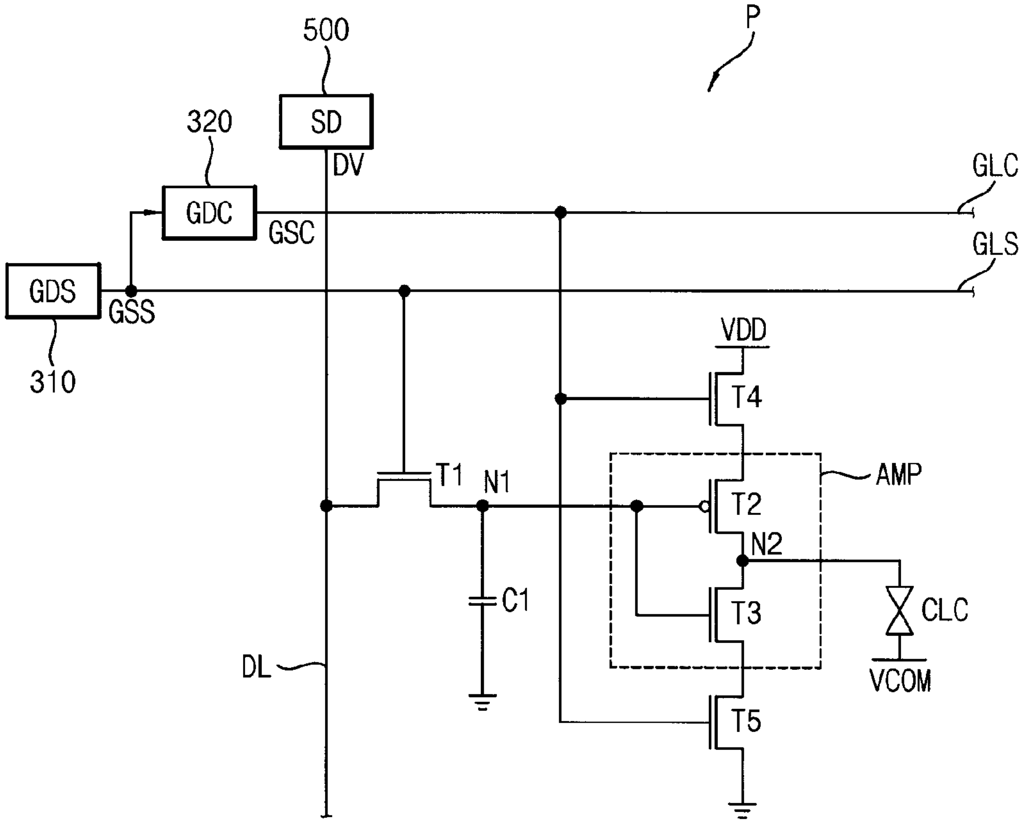
FIG. 6 is a circuit diagram illustrating a gate driver, a data driver and a pixel in a display panel of an alternative exemplary embodiment of a display apparatus, according to the invention.

FIG. 6 is a circuit diagram illustrating a gate driver, a data driver and a pixel of an alternative exemplary embodiment of a display apparatus, according to the invention.

The display apparatus shown in FIG. 6 is substantially the same as the exemplary embodiment of the display apparatus described referring to FIGS. 1 to 4 except for a structure of the gate driver. Thus, the same reference numerals will be used to refer to the same or like elements as used above to describe the exemplary embodiment of the display apparatus shown in FIGS. 1 to 4, and any repetitive detailed description thereof will be omitted.

Referring to FIGS. 1 to 3 and 6, the display apparatus includes a display panel 100 and a panel driver. The panel driver includes a timing controller 200, a gate driver 300, a gamma reference voltage generator 400 and a data driver 500.

An exemplary embodiment of the display panel 100 includes a plurality of setting gate lines GLS, a plurality of charging gate lines GLC, a plurality of data lines DL and a plurality of pixels P.

The gate driver 300 includes a setting gate driving part (GDS in FIG. 1) 310 and a charging gate driving part (GDC in FIG. 1) 320. The setting gate driving part 310 generates the setting gate signal GSS based on the first control signal CONT1 and applies the setting gate signal GSS to the setting gate line GLS and the charging gate driving part 320.

The charging gate driving part 320 generates the charging gate signal GSC based on the setting gate signal GSS and applies the charging gate signal GSC to the charging gate line GLC.

The setting gate line GLS provides the setting gate signal GSS to the pixel P. The charging gate line GLC provides the charging gate signal GSC to the pixel P.

The pixel P includes a first switching element T1, a control capacitor C1, an amplifying part AMP, a power supplying part and a liquid crystal capacitor CLC.

The charging gate driving part 320 may generate the charging gate signal GSC by OR operation of a plurality of the setting gate signals GSS.

Referring again to FIG. 4, the charging gate driving part 320 may generate the first charging gate signal GSC1 by OR operation of the first to third setting gate signals GSS1, GSS2 and GSS3. The charging gate driving part 320 may generate the second charging gate signal GSC2 by OR operation of the second to fourth setting gate signals GSS2, GSS3 and GSS4. The charging gate driving part 320 may generate the third charging gate signal GSC3 by OR operation of the third to fifth setting gate signals GSS3, GSS4 and GSS5.

In an exemplary embodiment shown in FIG. 5, the charging gate driving part 320 may generate the first charging gate signal GSC1 by OR operation of the first and second setting gate signals GSS1 and GSS2. The charging gate driving part 320 may generate the second charging gate signal GSC2 by OR operation of the second and third setting gate signals GSS2 and GSS3. The charging gate driving part 320 may generate the third charging gate signal GSC3 by OR operation of the third and fourth setting gate signals GSS3 and GSS4.

According to an exemplary embodiment, the control capacitor C1 has the capacitance less than the capacitance of the liquid crystal capacitor CLC such that the charging time, which corresponds to scanning time of the gate lines, may be decreased. Thus, the display panel 100 may have relatively high resolution. The pixel P includes the amplifying part AMP such that the pixel voltage charged to the liquid crystal capacitor CLC may be substantially great in the short charging time. Thus, the stain on the display panel is effectively prevented, and the display quality of the display panel 100 is thereby substantially improved.

The pixel P includes the amplifying part AMP such that a level of the data voltage DV may be decreased. In such an embodiment, the pixel voltage charged at the liquid crystal capacitor CLC is substantially great, such that the current flowing through the amplifying part AMP may be blocked using the power supplying part. Thus, the power consumption of the display apparatus may decrease.

According to exemplary embodiments of the invention as described above, the display quality of the display panel may be substantially improved and the power consumption of the display apparatus may substantially decrease.

The invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display panel comprising:

a plurality of setting gate lines to which a setting gate signal is applied;

a plurality of charging gate lines to which a charging gate signal is applied;

a plurality of data lines to which a data voltage is applied; and a plurality of pixels connected to the setting gate lines, the charging gate lines and the data lines, wherein each of the pixels comprises:

a first switching element connected to a corresponding setting gate line of the setting gate lines and a corresponding data line of the data lines;

a control capacitor configured to charge an output voltage of the first switching element;

an amplifying part configured to amplify the output voltage of the first switching element charged at the control capacitor;

a power supplying part connected to a corresponding charging gate line of the charging gate lines and configured to supply a power voltage to the amplifying part; and a liquid crystal capacitor configured to charge an output voltage of the amplifying part.

2. The display panel of claim 1, wherein the first switching element comprises:

a control electrode connected to the corresponding setting gate line;

an input electrode connected to the corresponding data line; and an output electrode connected to a first terminal of the control capacitor.

3. The display panel of claim 1, wherein the amplifying part comprises a second switching element and a third switching element, wherein the second switching element and the third switching element are connected to each other in series, an input node of the amplifying part is connected to a first terminal of the control capacitor, and an output node of the amplifying part is connected to a first terminal of the liquid crystal capacitor.

4. The display panel of claim 3, wherein the second switching element is a P-type transistor, and the third switching element is an N-type transistor.

5. The display panel of claim 3, wherein the power supplying part comprises a fourth switching element and a fifth switching element, the fourth switching comprises a control electrode connected to the corresponding charging gate line, an input electrode to which a high power voltage is applied, and an output electrode connected to an input electrode of the second switching element, and the fifth switching comprises a control electrode connected to the corresponding charging gate line, an input electrode connected to an output electrode of the third switching element, and an output electrode, to which a ground voltage is applied.

6. The display panel of claim 1, wherein a high level duration of the charging gate signal is longer than a high level duration of the setting gate signal.

7. The display panel of claim 6, wherein the high level durations of the charging gate signal is about N times the high level duration of the setting gate signal, and N is a positive integer equal to or greater than two.

8. The display panel of claim 7, wherein the charging gate signal applied to the corresponding charging gate line is generated by OR operation of a plurality of setting gate signals to be applied to N setting gate lines of the setting gate lines, wherein the N setting gate lines comprises the corresponding setting gate line.

9. The display panel of claim 1, wherein a capacitance of the liquid crystal capacitor is greater than a capacitance of the control capacitor.

10. The display panel of claim 1, wherein when a pixel voltage charged at the liquid crystal capacitor is denoted by x and a gain of the amplifying part is denoted by A, the data voltage is about x/A.

11. The display panel of claim 1, wherein the amplifying part comprises an inverting amplifier.

12. A display apparatus comprising:

a setting gate driving part which generates a setting gate signal;

a charging gate driving part which generates a charging gate signal;

a data driver which generates a data voltage; and a display panel comprising:

a plurality of setting gate lines to which the setting gate signal is applied;

a plurality of charging gate lines to which the charging gate signal is applied;

a plurality of data lines to which the data voltage is applied; and a plurality of pixels connected to the setting gate lines, the charging gate lines and the data lines, wherein each of the pixels comprises:

a first switching element connected to a corresponding setting gate line of the setting gate lines and a corresponding data line of the data lines;

a control capacitor configured to charge an output voltage of the first switching element;

an amplifying part configured to amplify the output voltage of the first switching element charged at the control capacitor;

a power supplying part connected to a corresponding charging gate line of the charging gate lines and configured to supply power to the amplifying part; and a liquid crystal capacitor configured to charge an output voltage of the amplifying part.

13. The display apparatus of claim 12, wherein the first switching element comprises:

a control electrode connected to the corresponding setting gate line;

an input electrode connected to the corresponding data line; and an output electrode connected to a first terminal of the control capacitor.

14. The display apparatus of claim 12, wherein the amplifying part comprises a second switching element and a third switching element, wherein the second switching element and the third switching element are connected to each other in series, an input node of the amplifying part is connected to a first terminal of the control capacitor, and an output node of the amplifying part is connected to a first terminal of the liquid crystal capacitor.

15. The display apparatus of claim 14, wherein the second switching element is a P-type transistor, and the third switching element is an N-type transistor.

16. The display apparatus of claim 14, wherein the power supplying part comprises a fourth switching element and a fifth switching element, the fourth switching comprises a control electrode connected to the charging gate line, an input electrode to which a high power voltage is applied and an output electrode connected to an input electrode of the second switching element, and the fifth switching comprises a control electrode connected to the charging gate line, an input electrode connected to an output electrode of the third switching element and an output electrode to which a ground voltage is applied.

17. The display apparatus of claim 12, wherein a high level duration of the charging gate signal is longer than a high level duration of the setting gate signal.

18. The display apparatus of claim 17, wherein the high level durations of the charging gate signal is about N times the high level duration of the setting gate signal, and N is a positive integer equal to or greater than two.

19. The display apparatus of claim 18, wherein the setting gate driving part outputs the setting gate signal to the setting gate line and the charging gate driving part, and the charging gate driving part generates the charging gate signal based on the setting gate signal.

20. The display apparatus of claim 19, wherein the charging gate signal applied to the corresponding charging gate line is generated by OR operation of a plurality of setting gate signals to be applied to N setting gate lines of the setting gate lines, wherein the N setting gate lines comprises the corresponding setting gate line.

* * * * *